United States Patent [19]

Needham

[11] 3,939,112

[45] Feb. 17, 1976

[54] THERMOPLASTIC RESIN COMPOSITION HAVING HIGH IMPACT STRENGTH

[75] Inventor: Donald G. Needham, Ramona, Okla.

[73] Assignee: Phillips Petroleum Company, Bartlesville, Okla.

[22] Filed: Nov. 18, 1974

[21] Appl. No.: 524,887

[52] U.S. Cl. .................. 260/33.6 AQ; 260/85.1
[51] Int. Cl.² ..................... C08K 5/01; C08L 9/06
[58] Field of Search .............. 260/33.6 AQ, 880 B

[56] References Cited
UNITED STATES PATENTS

| 3,281,383 | 10/1966 | Zelinski et al. .................. 260/85.1 |
| 3,448,175 | 6/1969 | Doak et al. ..................... 260/880 R |
| 3,485,894 | 12/1969 | Porter ........................... 260/880 B |
| 3,562,204 | 2/1971 | Van Breen ...................... 260/880 B |
| 3,614,836 | 10/1971 | Snyder et al. .................... 260/880 B |
| 3,639,517 | 2/1972 | Kitchen et al. ..................... 260/879 |
| 3,718,616 | 2/1973 | Muirhead ........................ 260/28.5 B |
| 3,738,951 | 6/1973 | Middlebrook ................... 260/23.7 M |

OTHER PUBLICATIONS

Rubber World—Materials & Compounding Ingredients for Rubber (Bill Brothers)(N.Y.)(1968), page 294.

*Primary Examiner*—Donald E. Czaja
*Assistant Examiner*—H. H. Fletcher

[57] ABSTRACT

A thermoplastic resin composition is disclosed which contains a polymodal, resinous, branched block butadiene/styrene copolymer and a naphthenic extender oil. The resin has very high impact strength.

9 Claims, No Drawings

THERMOPLASTIC RESIN COMPOSITION HAVING HIGH IMPACT STRENGTH

The present invention relates to thermoplastic resin materials. More particularly, it relates to polymodal branched block butadiene/styrene copolymers.

BACKGROUND OF THE INVENTION

Branched block copolymers of butadiene and styrene are disclosed in U.S. Pat. No. 3,281,383 to Zelinski et al. These polymers have several advantageous properties. Further improvements were achieved by the so-called polymodal branched block copolymers of butadiene and styrene disclosed in U.S. Pat. No. 3,639,517 to Kitchen et al. The resins are described therein to have strength, clarity, processability and environmental durability. For many applications of these resins, their impact strength is an important feature. The impact strength is a measure of the impact the resin can stand without breaking. The higher the impact strength of a certain resin, the less likely it is that an article made from this resin will break when subjected to impacts or when dropped. It would, therefore, be desirable to increase the impact strength of said polymodal resins.

THE INVENTION

It is thus one object of this invention to provide novel polymeric compositions.

A further object of this invention is to provide thermoplastic compositions which have high impact strength.

In accordance with this invention, I have now found that a composition of matter consisting essentially of a polymodal branched block copolymer and a modifying amount of naphthenic extender oil possesses an impact strength which is drastically increased over the impact strength of the polymodal resin alone.

The polymodal resin useful in accordance with this invention has the generic formula $$(A-B)_x Y$$

wherein $A$ is essentially a block of polymerized monovinyl-substituted aromatic monomers of 8 to about 16 carbon atoms; $B$ is essentially a polymerized conjugated alkadiene block, the alkadiene having 4 to about 12 carbon atoms; $Y$ is an atom or group of atoms derived from a polyfunctional coupling agent; and $x$ represents the number of functional groups of said polyfunctional coupling agent.

The resin useful in accordance with this invention is branched. That means more than two blocks A-B are connected via one radical of the polyfunctional coupling agent.

The preferred weight distribution of A and B is such that the polymer comprises about 70 to about 95 weight percent, more preferably about 75 to about 85 weight percent of the polymerized monovinyl-substituted aromatic hydrocarbon and about 30 to about 5 weight percent, more preferably about 25 to about 15 weight percent of the polymerized conjugated alkadiene monomer. The polymer blocks A-B demonstrate a plurality of modes on a gel permeation chromatograph before coupling.

Presently preferred is the polymodal resin obtained by copolymerizing butadiene and styrene, coupled by an epoxidized linseed oil having an average of about 5 functional groups per molecule. Another preferred polymer is derived from isoprene and styrene as comonomers. The preferred resins can additionally be defined as having a melt flow of about 0.5 to about 20.0 as determined by ASTM D-1238-65T, Condition G, and when formed into an article as demonstrating a haze transmittance in the range of about 0 to about 20 percent as determined by ASTM D-1003-61, Procedure A, a falling ball impact strength value of at least 1.0 ft.-lbs. and environmental stress cracking resistance value of at least 100 days at 0 percent failure.

These polymodal branched block copolymers can be prepared by first essentially completely polymerizing a substantial portion of the total amount of a monovinyl-substituted aromatic hydrocarbon monomer having 8 to about 18 carbon atoms with an organolithium initiator. Then, the remainder of about 10 to about 60 weight percent of the total vinyl-substituted aromatic monomer together with additional initiator are added and polymerized in one or more increments. Together with the additional monomer, organolithium catalyst is added in such quantities that the molecular weight distribution of the blocks made from the added monomer differs substantially from increment to increment. Each increment is allowed to polymerize essentially completely. Thereafter, a conjugated alkadiene monomer of 4 to about 12 carbon atoms is charged to the reaction product and polymerized to essential completion. Then, a polyfunctional coupling agent having at least three reactive sites per molecule capable of reacting with the lithium terminals of the blocks prepared before is added. Thus, the polymodal branches are coupled to form the polymodal branched block copolymer, one essential ingredient of the composition of this invention.

The polymodal polymers useful in the composition of this invention as well as the methods to make same are disclosed in more detail in the U.S. Pat. No. 3,639,517, which is hereby included in this disclosure by reference. The presently preferred polymer is a polymodal, branched butadiene/styrene block copolymer comprising about 24 weight percent butadiene and about 76 weight percent styrene. The branches of this radial block copolymer have a bimodal molecular weight distribution in the styrene blocks.

Naphthenic extender oils useful in accordance with this invention comprise naphthenes or paraffins and some aromatic hydrocarbons. The naphthenic extender oils such as conventionally employed in rubber formulations can be used for the purpose of this invention. These oils have a viscosity in the range of about 100 to about 5,000 SUS at 100°F. In a presently preferred embodiment, such oils contain about 40 weight percent naphthenics, about 45 weight percent paraffins, and about 15 weight percent aromatics.

The composition of this invention can also contain small amounts of conventionally employed additives such as stabilizers, antioxidants, antiblocking agents, pigments, and the like.

The compounding of the composition of this invention is done by conventional means. The ingredients are mixed together using commercially available equipment, e.g., extruders or blenders.

The invention will be more fully understood from the following examples.

EXAMPLE I

One hundred parts by weight of a polymodal branched block butadiene/styrene copolymer resin having a weight ratio of butadiene to styrene of 24/76, a melt flow (ASTM D-1238-65T, Condition G) of 5.0 g/10 min., a density (ASTM D-792-66) of 1.04 g/cc and a Vicat softening point (ASTM D-1525-70) of 200°F and containing 1.5 parts by weight of tri(nonylphenyl)-phosphite containing 1 weight percent of triisopropanolamine[1], 0.5 part by weight of 2,6-di-tert-butyl-4-methylphenol[2] and 0.25 part by weight of a microcrystalline wax were compounded on a Banbury blender with various quantities of naphthenic extender oil (ASTM D-2226 Type 103) having a viscosity of 760 SUS at 100°F, a flash point of 410°F and an aniline point of 179°F[3]. The test results of this composition are shown in Table I.

[1]Polygard HR, Uniroyal
[2]Ionol antioxidant, Shell Oil Co.
[3]Sunthene 380, Sun Oil Co.

TABLE I

| | (Polymodal Resin)[4] | | |
|---|---|---|---|
| Extender Oil Wt. % | Notched Izod[1] Impact, Room Temperature ft. lbs./inch | Tensile[2] Strength psi | Elongation[3] % |
| 0 | .51 | 2200 | 300 |
| 5 | .45 | 1500 | 307 |
| 10 | 3.63 | 1340 | 272 |
| 15 | 6.16 | 1191 | 257 |

[1]Izod impact strength, measured on a notched specimen in accordance with ASTM D-256-72a.
[2]Tensile strength, measured in accordance with ASTM D-638-72.
[3]Elongation, determined in accordance with ASTM D-638-72.
[4]KR-03 resin, Phillips Petroleum Company.

The results of this Table show that the addition of the naphthenic extender oil drastically increases the impact strength of the resin. This large increase in impact strength of the composition is unexpected.

EXAMPLE II

In order to compare the properties of the composition of this invention with a composition comprising a resin which is non-polymodal, a further series of compositions were prepared by blending a branched butadiene/styrene block copolymer resin having a weight ratio of butadiene to styrene of 24 to 76, However, not being polymodal, with the same additives and oil quantities as shown in Example I. The test results of the composition made are shown in Table II. The non-polymodal block copolymer was prepared by the same method as the polymodal polymer of Example I except that the monovinyl aromatic monomer was not added incrementally with additional initiator so that the molecular weight distribution of the block is essentially uniform.

TABLE II

| | (Non-polymodal Resin)[4] | | |
|---|---|---|---|
| Extender Oil Wt. % | Notched Izod[1] Impact, Room Temperature ft. lbs./inch | Tensile[2] Strength psi | Elongation[3] % |
| 0 | .22 | 3575 | 7 |
| 5 | .23 | 2975 | 8 |
| 10 | .26 | 2625 | 5 |
| 15 | .20 | 2450 | 6 |

[1]Izod impact strength, measured on a notched specimen in accordance with ASTM D-256-72a.
[2]Tensile strength, measured in accordance with ASTM D-638-72.
[3]Elongation, determined in accordance with ASTM D-638-72.
[4]KR-01 resin, Phillips Petroleum Company.

The results of Table II show that the impact strength of a non-polymodal branched block copolymer is not increased by the addition of naphthenic extender oil. This is in contrast to the results of Table I showing that a polymodal branched block copolymer has notched impact strength which is increased about 10 to about 14 times as compared to that of the resin containing no naphthenic extender oil. Table II even shows that the addition of about 15 weight percent of extender oil reduces the impact strength of the non-polymodal branched block copolymer. A comparison of Tables I and II thus shows that the addition of the naphthenic extender oil to a polymodal resin drastically increases the impact strength thereof whereas this is not the case for a non-polymodal resin.

EXAMPLE III

The operation of Example I was repeated using different quantities of extender oil as well as samples from different lots of the polymodal branched block copolymer production. The results are shown in the following Table III.

TABLE III

| Extender Oil Wt. % | Izod Impact[1] Ft. lbs./in. Run Number | | Tensile[2] (psi) Run Number | | Elongation[3] % Run Number | |
|---|---|---|---|---|---|---|
| | (1) | (2) | (1) | (2) | (1) | (2) |
| 0 | .43 | NR[4] | 1650 | 1850 | 283 | 293 |
| 2 | .40 | NR | 2400 | NR | 197 | NR |
| 5 | .61 | 4.4 | 1400 | 2050 | 371 | 167 |
| 10 | 4.88 | 4.13 | 1150 | 1375 | 182 | 263 |
| 15 | 4.18 | 5.62 | 1550 | 1725 | 109 | 51 |
| 20 | 4.86 | NR | 950 | NR | 213 | NR |

[1]Izod impact strength, measured on a notched specimen in accordance with ASTM D-256-72a.
[2]Tensile strength, measured in accordance with ASTM D-638-72.
[3]Elongation, determined in accordance with ASTM D-638-72.
[4]NR, not run.

The data of Table III show that the naphthenic extender oil largely increases the impact strengths of the resin in each case. The tensile strength and the elongation decrease by the addition of the extender oil to a certain degree. However, the impact strength is considered more important in several applications of these resins such as toys and decorative molded pieces as well as packaging. Best overall properties are obtained with about 10 weight percent of the naphthenic extender oil incorporated into the composition.

Reasonable variations and modifications which will be apparent to those skilled in the art can be made in this invention without departing from the spirit and scope thereof.

I claim:
1. A composition consisting essentially of
   a. a polymodal radial brached block copolymer of the general formula
   $(A-B)_xY$
   wherein $A$ is essentially a block of polymerized monovinyl-substituted aromatic monomers of 8 to about 16 carbon atoms; $B$ is essentially a polymerized conjugated alkadiene block, the alkadiene having 4 to about 12 carbon atoms; $Y$ is an atom or group of atoms derived from a polyfunctional coupling agent; and $x$ represents the number of functional groups of said polyfunctional coupling agent, and
   b. an amount of a naphthenic extender oil which increases the impact strength.
2. A composition in accordance with claim 1 wherein said polymodal resin consists essentially of about 70 to about 95 weight percent of polymerized monovinyl-substituted aromatic hydrocarbon monomer and about

30 to about 5 weight percent of polymerized conjugated alkadiene monomer.

3. A composition in accordance with claim 2 wherein said polymodal resin consists essentially of about 75 to about 85 weight percent of polymerized monovinyl-substituted aromatic hydrocarbon monomer containing from 8 to about 18 carbon atoms and from about 25 to about 15 weight percent of polymerized conjugated alkadiene monomer containing from 4 to about 12 carbon atoms.

4. A composition in accordance with claim 3 wherein the weight ratio of the monovinyl-substituted aromatic hydrocarbon monomer to the conjugated alkadiene is about 76 to about 24.

5. A composition in accordance with claim 1 wherein B is essentially a block of poly-1,3-butadiene.

6. A composition in accordance with claim 1 wherein B is essentially a block of polyisoprene.

7. A composition in accordance with claim 1 wherein A is essentially a block of polystyrene.

8. A composition in accordance with claim 1 wherein the naphthenic extender oil has a viscosity of about 100 to about 5,000 SUS at 100°F.

9. A composition in accordance with claim 8 containing about 10 to about 15 weight percent of naphthenic extender oil.

* * * * *